(12) United States Patent
Song

(10) Patent No.: US 11,741,433 B2
(45) Date of Patent: Aug. 29, 2023

(54) INTERACTIVE SCHEDULING, VISUALIZATION, AND TRACKING OF ACTIVITIES

(71) Applicant: Victor Song, Cambridge, MA (US)

(72) Inventor: Victor Song, Cambridge, MA (US)

(*) Notice: Subject to any disclaimer, the term of this patent is extended or adjusted under 35 U.S.C. 154(b) by 298 days.

(21) Appl. No.: 16/872,113

(22) Filed: May 11, 2020

(65) Prior Publication Data

US 2020/0372471 A1 Nov. 26, 2020

Related U.S. Application Data

(60) Provisional application No. 62/851,226, filed on May 22, 2019.

(51) Int. Cl.
G06Q 10/00 (2023.01)
G06Q 10/109 (2023.01)
G04G 9/00 (2006.01)

(52) U.S. Cl.
CPC ........... G06Q 10/109 (2013.01); G04G 9/007 (2013.01)

(58) Field of Classification Search
CPC .... G06Q 10/109; G04G 9/007; G04G 9/0064; G04G 9/025; G04G 11/00
See application file for complete search history.

(56) References Cited

U.S. PATENT DOCUMENTS

| | | | | |
|---|---|---|---|---|
| 10,168,669 B2 * | 1/2019 | Knappe | | G04G 21/04 |
| 2005/0094492 A1 * | 5/2005 | Rosevear | | G04G 9/04 |
| | | | | 368/17 |
| 2010/0157742 A1 * | 6/2010 | Relyea | | G04G 11/00 |
| | | | | 715/833 |
| 2015/0067564 A1 * | 3/2015 | Foley | | G06F 3/04883 |
| | | | | 715/771 |
| 2015/0212686 A1 * | 7/2015 | Hobbs | | G06F 3/04847 |
| | | | | 715/863 |
| 2015/0222743 A1 * | 8/2015 | Lee | | H04M 1/7246 |
| | | | | 455/566 |
| 2015/0378320 A1 * | 12/2015 | Knight | | G04G 11/00 |
| | | | | 368/107 |
| 2016/0313869 A1 * | 10/2016 | Jang | | G04G 9/00 |
| 2018/0004169 A1 * | 1/2018 | Matsuzaki | | G06F 1/163 |
| 2019/0038184 A1 * | 2/2019 | Narasimhan | | G06F 1/163 |
| 2019/0103180 A1 * | 4/2019 | Denise | | G16H 20/10 |
| 2019/0114204 A1 * | 4/2019 | Lindman | | G06F 1/3287 |
| 2019/0339860 A1 * | 11/2019 | Chen | | G06F 3/04886 |
| 2020/0356242 A1 * | 11/2020 | Wilson | | G04G 9/0076 |

OTHER PUBLICATIONS

Athmanathan Panneerselvam, Praveen, "Online Circular Calendar" (2009). Master's Projects. SJSU ScholarWorks (Year: 2009).*

* cited by examiner

*Primary Examiner* — Andrew T McIntosh

(57) ABSTRACT

Methods are presented for interactive scheduling, visualization, and tracking of daily recurring activities. Color code a loop as an analog clock, based on an attribute at any time on a day. In some embodiments, the loop is a displayed annulus, and the attribute is light condition. Change date interactively for quick and intuitive study of daily light conditions over a year. Display color coded concentric arcs for scheduling and monitoring performance of activities. Track and visualize progress of multiple activities, to remind users the suitability of the activities at any time instant. Change the time instant interactively for quick study of the progress of multiple activities.

2 Claims, 4 Drawing Sheets

INTERACTIVE SCHEDULING, VISUALIZATION, AND TRACKING OF ACTIVITIES

REFERENCES

U.S. Patent Documents

| | | |
|---|---|---|
| 10565565 | February 2020 | Gentzkow et al |
| 10261656 | April 2019 | Yanchar et al |
| 10088973 | October 2018 | Shoham et al |
| 7218575 | May 2007 | Rosevear |
| 6449219 | September 2002 | Hepp et al |
| 10025496 | July 2018 | Park et al |
| 9552572 | January 2017 | Shin |
| 8522163 | August 2013 | Relyea et al |
| 7394725 | July 2008 | Bloch |
| 6901032 | May 2005 | Eo et al |
| 10620590 | April 2020 | Guzman et al |
| 9804759 | October 2017 | Wilson et al |
| 8693291 | April 2014 | Umamoto |
| 8436810 | May 2013 | Langereis et al |
| 5023849 | June 1991 | Vaucher |

BACKGROUND

Life on Earth is adapted to the rotation of our planet. Humans have an internal biological clock that helps them anticipate and adapt to the regular rhythm of the day, namely circadian rhythm. Medical research has shown the importance of circadian rhythm for human health. The biological clock helps regulate sleep patterns, feeding behavior, hormone release, blood pressure, and body temperature, etc. Certain recurring activities are better performed at certain times on a daily basis, for health and productivity.

Traditionally clocks have been used to display time and certain other information. Calendars have been used to schedule activities. However, there is no convenient tool to convey the importance of circadian rhythm to the general public, and help them maintain regular and proper schedules of multiple daily recurring activities. In particular, it would be valuable to develop tools for examining daily light conditions, since lighting is the primary signal for circadian rhythm.

BRIEF SUMMARY

Methods are presented for scheduling, visualization, and tracking daily recurring activities, together with interactive study of environment change, particularly light conditions, in order to maintain a regular and proper daily schedule. Some examples are given below.

A method for color coding an analog clock, comprises: providing a loop as an analog clock, with a direction of time travel on the loop, where each section of the loop perpendicular to the direction of time travel represents a time instant on a day, a segment of the loop along the direction of time travel represents a time period on the day, and the loop represents the whole day; painting the loop with the color for each perpendicular section selected based on an attribute at the time instant of the perpendicular section.

A method for activity tracking, comprises: providing a device with a storage medium; storing, in the storage medium, one or more daily recurring activities, each with a scheduled time period shorter than a day; providing a means for computing the progress of a daily recurring activity at a time instant on a day, including: the condition whether the scheduled time period of the activity on the day includes the time instant, and the completed duration of the activity at the time instant, if the condition is true.

A method for interactive scheduling, visualization, and tracking of activities, comprises: displaying, via a display device, an annulus as a 24-hour analog clock; color coding the annulus based on the light conditions on a day; changing the date of the day interactively, for continuously studying the daily light conditions over a year; storing one or more daily recurring activities, each with a scheduled time period shorter than a day; displaying a first arc concentric to the annulus, for representing the scheduled time period of a daily recurring activity; adjusting the scheduled time period by rotating the first arc, while satisfying certain constraints; displaying one or more arcs concentric to the annulus, each representing the actual performance of the activity during the corresponding time period; computing the progress of a daily recurring activity at a time instant, including: the condition whether the scheduled time period of the activity includes the time instant, and the completed duration of the activity at the time instant, if the condition is true; selecting a particular daily recurring activity at a time instant, based on the progress of all daily recurring activities at the time instant.

DETAILED DESCRIPTION

Methods are presented for scheduling, visualization, and tracking daily recurring activities, together with interactive study of environment change, particularly light conditions. The purpose is to help users maintain a regular and proper daily schedule of various activities, and improve health and productivity. Some embodiments are given below as examples.

In some embodiments, a method comprises: providing a loop and a direction of time travel on the loop; providing a storage medium; storing a date in the storage medium; locating a start perpendicular section of the loop perpendicular to the direction of time travel, for representing start of the day on the date, so that each perpendicular section of the loop represents a time instant on the day, a segment of the loop along the direction of time travel represents a time period on the day, and the loop represents the whole day; providing a means for selecting a color for a perpendicular section of the loop, based on an attribute at the time instant of the perpendicular section; and painting each perpendicular section of the loop with the color selected by the means; whereby the loop can serve as a color coded analog clock, for studying the daily change of the attribute.

In some embodiments, a method comprises: providing a device with a storage medium; storing identifiers of one or more daily recurring activities in the storage medium; storing one or more time periods in the storage medium, each time period being shorter than a day, representing the scheduled time period of a daily recurring activity, and the number of time periods being equal to the number of daily recurring activities; providing a means for computing the progress of a daily recurring activity at a time instant on a day, including: the condition whether the scheduled time period of the activity includes the time instant, and the completed duration of the activity at the time instant, if the condition is true; storing, in the storage medium, the progress of all daily recurring activities at a time instant, computed by the means; whereby the device can track the progress of daily recurring activities at any time.

In some embodiments, a method is described as the following, for interactive scheduling, visualization, and tracking of activities.

Figure 1:
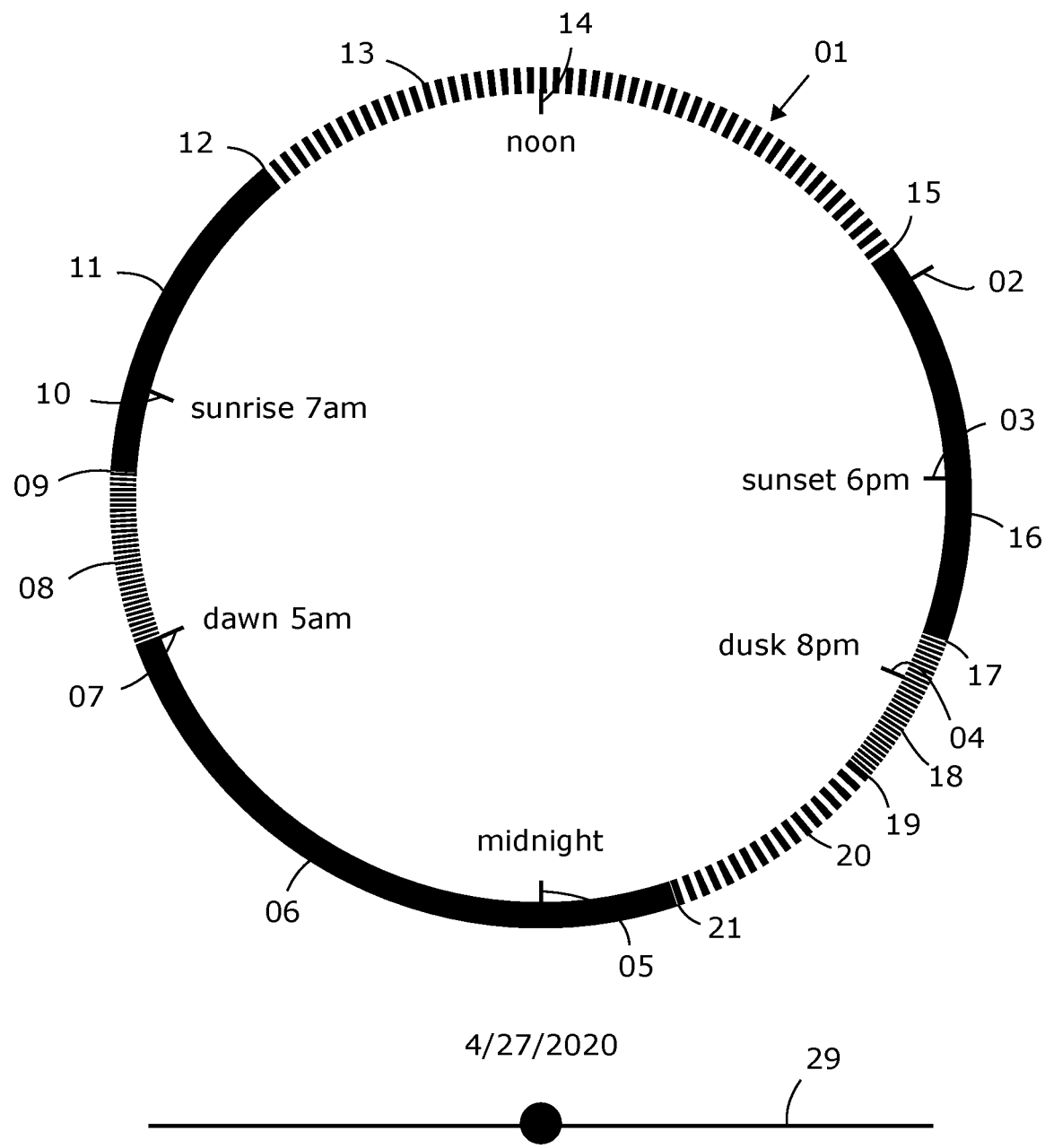
FIG. 1 shows an annulus representing a 24-hour clock, color-coded based on light conditions on a day, together with a slider for changing the date.

Provide a first device with a display device and a storage medium. Store a date in the storage medium, Apr. 27, 2020 for example, as shown in FIG. 1. Store, in the storage medium, identifiers of one or more daily recurring activities, including, for each activity: a first indicium for indicating that the activity is scheduled at a time instant, and a second indicium for indicating that the activity is not scheduled at a time instant. Examples of activities are work, exercise, eating, coffee drinking, sleep, and leisure. Display, via the display device, an annulus 01. Interpret annulus 01 as an analog clock, including: set the direction of time travel clockwise; set the bottom section of annulus 01 as start of the day on the date, or midnight, as indicated by indicium 05; set the top section of annulus 01 as noon, as indicated by indicium 14. Each section of annulus 01 on a line from the center of annulus 01 is perpendicular to the direction of time travel, and represents a time instant on the day. Each arc of annulus 01 represents a time period. Each concentric arc of annulus 01 also represents a time period, and each end of the concentric arc represents the start or end of the time period, based on the direction of time travel. Each point on the screen of the display device represents a time instant, as it can be viewed as a point on a concentric arc of annulus 01. Each angle centered at the center of annulus 01 represents a time period, as it forms many concentric arcs with the same time period.

Obtain the dawn, sunrise, sunset, and dusk times on the date. Mark the dawn time with indicium 07, the sunrise time with indicium 10, the sunset time with indicium 03, and the dusk time with indicium 04.

Paint different segments (arcs) of annulus 01 with color gradients that indicates the light condition or suitability of certain activities during the corresponding time periods, based on a common interpretation and association of colors. For example, mark a section 09 of annulus 01 at a time instant between dawn and sunrise, a section 12 at a time instant between sunrise and noon, a section 15 at a time instant between noon and sunset, a section 17 at a time instant between sunset and dusk, a section 21 at the scheduled bedtime of the user, and a section 19 at a time instant between dusk and the scheduled bedtime. Set the color of arc 06 black, between the scheduled bedtime and dawn, for indicating darkness during sleep time, which is required for good sleep. Set the color of section 09 purple, for indicating the dim light condition between dawn and sunrise. Set the color gradient of arc 08 from black to purple, between indicium 07 at dawn and section 09. Set the color of section 12 blue, for indicating the preferred blue light in the morning, since it helps people wake up and become more alerted. Set the color gradient of arc 11 from purple to blue, between section 09 and section 12. Set the color of section 15 green, for indicating afternoon, since green hints outdoor environment, where people can walk around or exercise moderately to boost creativity and productivity when feel tired in the afternoon. Set the color gradient of arc 13 from blue to green, between section 12 and section 15. Set the color of section 17 yellow, for indicating warm light in the evening, since warm light helps people prepare for sleep. Set the color gradient of arc 16 from green to yellow, between section 15 and section 17. Set the color of section 19 red, for indicating warm artificial lighting at night. Set the color gradient of arc 18 from yellow to red, between section 17 and section 19. Set the color gradient of arc 20 from red to black, between section 19 and section 21. With this color coding, annulus 01 has smooth color gradients that help the user understand natural light conditions, and hint different preferred activities or artificial lighting at different times on the day. Together with an indicium 02 for the current time, annulus 01 serves as a color coded analog clock.

Provide a first means for changing the date, such as slider 29, so that the user can continuously study the change of light conditions over a year.

Figure 2:
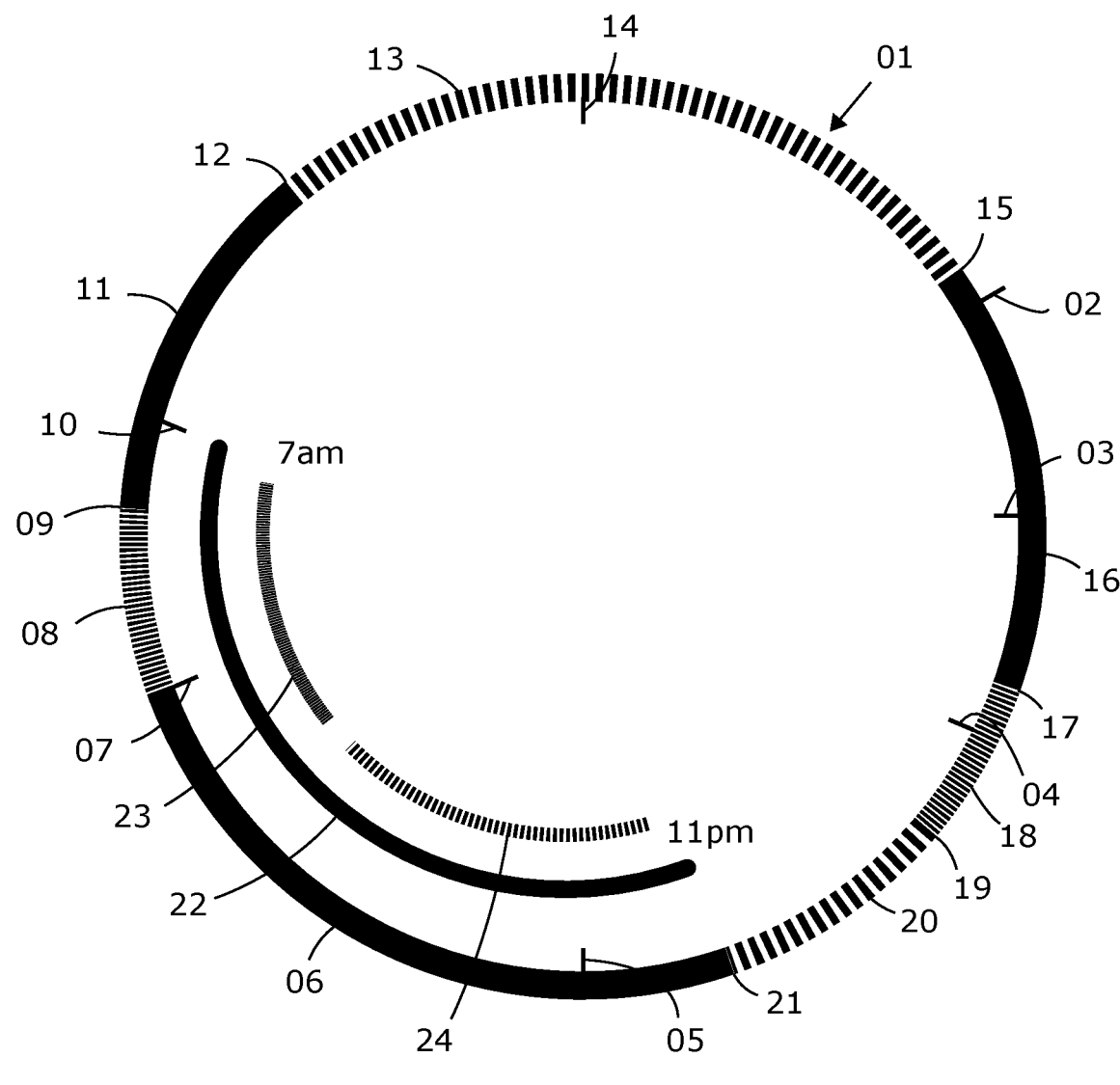
FIG. 2 shows the same annulus, with schedule of sleep and actual sleep data.

Display, via the display device, a concentric arc 22 of annulus 01, for representing the scheduled time period of sleep, which is between 11 pm and 7 am as shown in FIG. 2. Paint arc 22 with a purple color, which is often associated with sleep and dreams. Provide a second means for adjusting the scheduled time period, by rotating arc 22 around the center of annulus 01, with a pointing device. Examples of such a pointing device are computer mouse and finger. Rotating the whole arc 22 moves the scheduled time period, while maintaining the duration, which is 8 hours as shown in FIG. 2. Rotating an end of arc 22 adjusts either the start or the end of the scheduled time period. Constrain the movement of arc 22 based on certain restrictions on sleep. For example, limit bedtime between 7 pm and midnight, and the duration of sleep between 6 and 12 hours. While rotating arc 22, if the location of the pointing device stays inside annulus 01, it determines the new time directly. If the pointing device stays outside annulus 01, the rotation gesture moves arc 22 and the corresponding time at a lower speed, to fine-tune the schedule. Similar arcs can be displayed and rotated for scheduling other activities, and painted with certain color gradients. For example, an arc for scheduling daily eating can be painted with a color gradient from dark orange to light orange, to indicate the recommendation of heavy eating earlier in the day, and light eating later in the day. Store, in the storage medium, the scheduled time periods of the daily recurring activities.

With the adjustable arc 22 beside annulus 01, the user can schedule activities, and compare with light conditions interactively.

Display, via the display device, concentric arc 23 and concentric arc 24, for representing analysis of sleep during different time periods, either on a previous day or aggregated over many previous days. Paint them with different colors to indicate whether the user was in bed or asleep. By displaying the schedule arc 22 as well as activity performance arcs 23 and 24 beside annulus 01, the user can quickly compare the light condition, the schedule and actual performance of a daily activity. Similar concentric arcs can be displayed at different locations for other daily recurring activities, so that all activities are scheduled.

Provide a third means for computing the progress of a daily recurring activity at a time instant on a day, including: the condition whether the scheduled time period of the activity on the day includes the time instant; and the completed duration of the activity at the time instant on the day, if the condition is true. Store, in the storage medium, the progress of all daily recurring activities at a time instant on a day, computed by the third means. For some activities, such as eating, coffee drinking, and exercise, the scheduled time period represents suitability, instead of constant performance of the activity.

Figure 3:
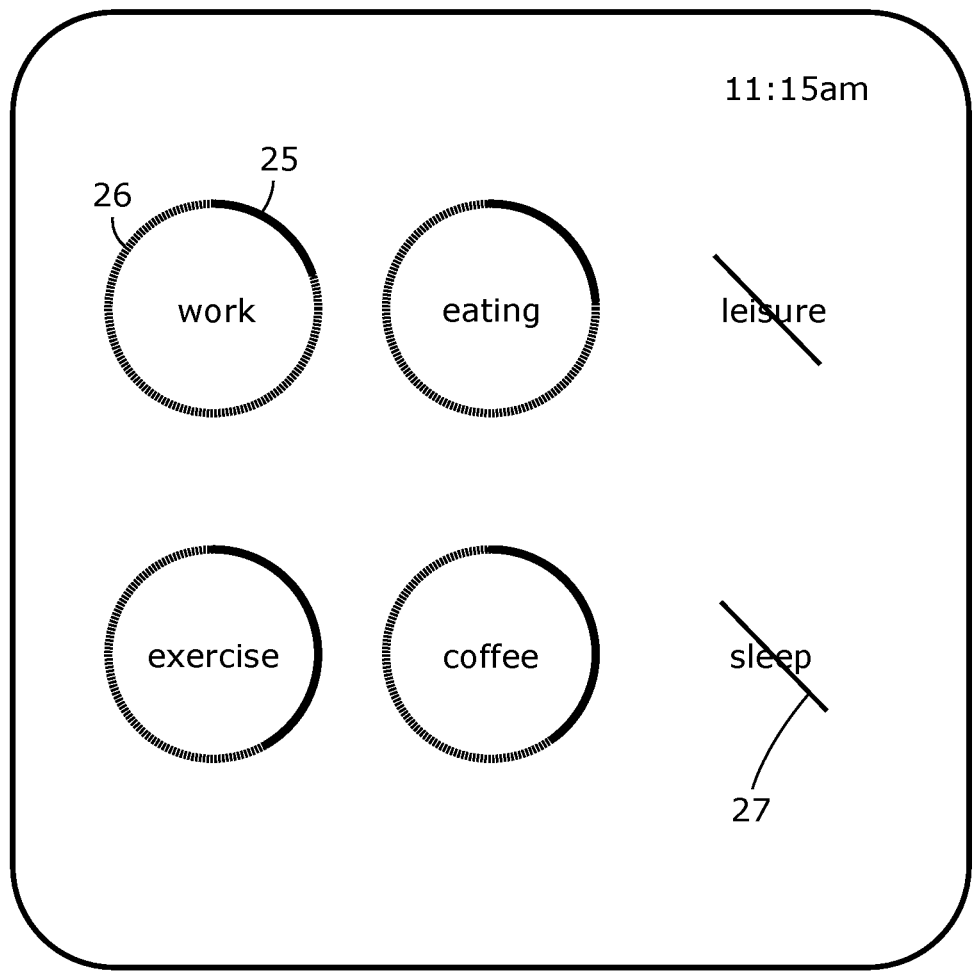
FIG. 3 shows the progress of 6 activities at a time in the morning.

Display, on a display device, the progress of the activities. FIG. 3 shows the progress of 6 activities at time instant 11:15 am, assuming a certain schedule for each activity. For work, the scheduled time period includes the time instant. Display the first indicium for work to indicate this condition. In the example in FIG. 3, the first indicium for work is the activity name "work". In another example, it may be a colorful icon. Display an annulus 26 around the first indicium, to indicate the scheduled time period of work. Paint annulus 26 with a color gradient from blue to yellow, with a low saturation, to indicate different types of work suitable for different time during the scheduled time period. Display an arc 25, superimposed on annulus 26, for indicating the progress of work. The start of arc 25 is on the top of annulus 26, and represents the start of work. The length of arc 25 represents the completed duration of the activity. Paint arc 25 with the color gradient of annulus 26, but with a high saturation, to distinguish arc 25. For 3 other activities, including exercise, eating, and coffee drinking, the scheduled time periods also include the time instant 11:15 am. Therefore, display annuli and arcs to indicate their progress, in a similar way to work. Since the scheduled time period of sleep does not include the time instant, display the second indicium for sleep 27. In the example in FIG. 3, the second indicium 27 is the name of the activity with a slanted line across it. In another example, it may be a grayscale icon with a slanted line across it. Similarly, display the second indicium for the leisure activity.

Figure 4:
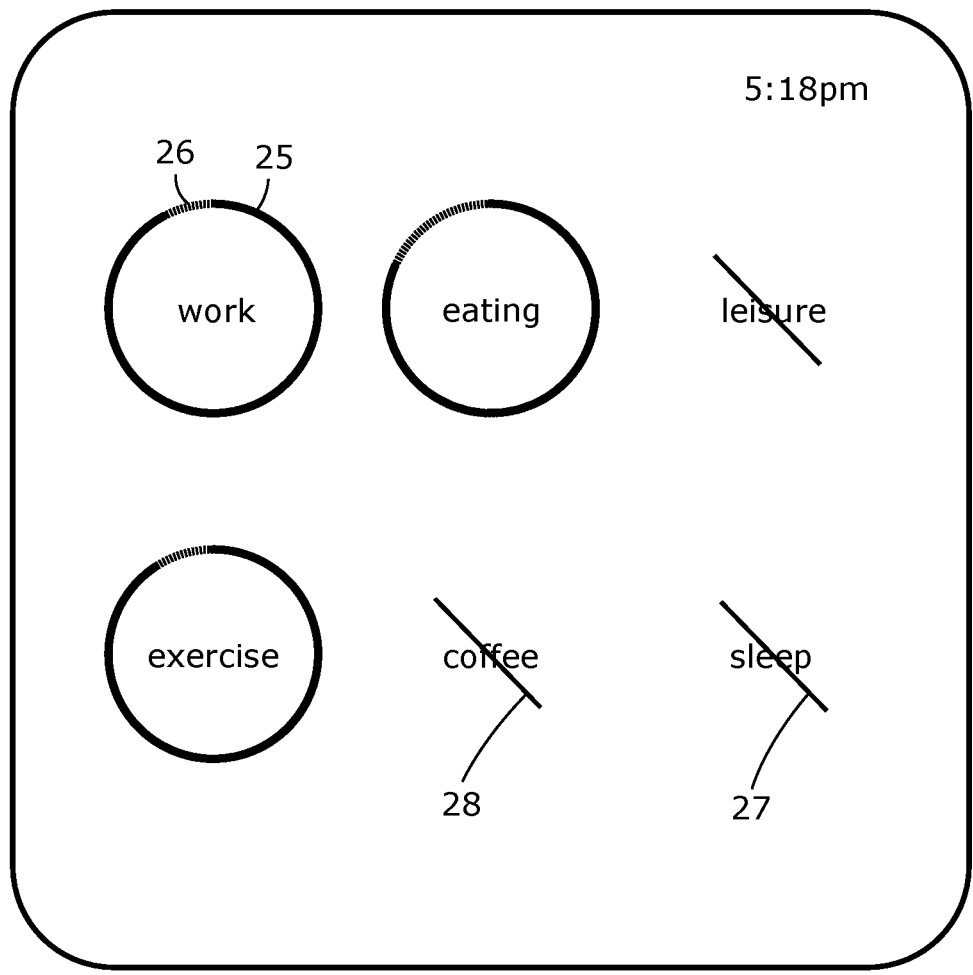
FIG. 4 shows the progress of the 6 activities at a time in the afternoon.

FIG. 4 shows the progress of the activities at time instant 5:18 pm. It is evident that the work activity has progressed further for the day, as indicated by the length of arc 25. Similar progress is visualized for exercise and eating. Since the scheduled time period of coffee drinking does not include the time instant, display the second indicium for coffee drinking 28, instead of the first indicium in FIG. 3. This advises the user that it's no longer suitable to drink coffee so late in the day, since caffeine disturbs sleep.

Provide a fourth means for changing indicium 02 on annulus 01 as shown in FIG. 1 and FIG. 2, to change the time instant it represents. For example, rotate a pointing device clockwise on annulus 01 to rotate indicium 02 clockwise and increase the time, or rotate the pointing device counterclockwise to rotate indicium 02 counterclockwise and decrease the time. When the rotation of indicium 02 exceeds a full circle clockwise, change the date to the next day. When the rotation of indicium 02 exceeds a full circle counterclockwise, change the date to the previous day. Thus rotating indicium 02 is a way of slow date change, instead of fast date change by slider 29. Examples of a pointing device are computer mouse and finger. Track and display the progress of the activities while changing indicium 02, so that the user can study the progress of the activities at different times quickly.

In some embodiments, the display device is small, such as a smart watch, where the user can check progress of activities conveniently. On such a small device, screen space may be very small for a software application, since multiple applications may run simultaneously, and share the screen. It may be impractical to display the progress of all activities simultaneously. To solve this problem, provide a means for selecting a particular activity at a time instant. For example, at 5:18 pm as shown in FIG. 4, while it is useful to indicate the progress of all activities, for the quality of sleep later, it is particularly helpful to indicate that the user should not drink coffee at the time. Therefore, at the time instant, select coffee drinking as the particular activity, and display its second indicium alone in the limited screen space. At a different time, another particular activity may be selected, and the corresponding second indicium may be displayed alone.

With constant tracking and visualization of activities, the user can be reminded to maintain a regular and proper daily schedule, to achieve better health and productivity.

What is claimed is:

1. A method, comprising:
   a. providing an annulus, representing a clock;
   b. providing an arc concentric to the annulus, representing the schedule of an activity;
   c. providing a pointing device for rotating the arc to change the schedule of the activity;
   d. providing a means to change the rotation speed depending on whether the pointing device is inside or outside the annulus, thereby enabling dual speed adjustment of the schedule.

2. A method, comprising:
   a. providing an annulus, representing a clock;
   b. providing an arc concentric to the annulus, representing the schedule of an activity;
   c. providing a pointing device for rotating the arc to change the schedule of the activity;
   d. providing a means to constrain the schedule of the activity, and constrain the rotation of the arc, to satisfy the constraints on the schedule.

* * * * *